US005213205A

United States Patent [19]

Laubach et al.

[11] Patent Number: 5,213,205

[45] Date of Patent: May 25, 1993

[54] SWITCH ENCLOSURE

[75] Inventors: William Laubach, Elk Grove Village; Scott Robillard, Aurora, both of Ill.

[73] Assignee: Pittway Corporation, Chicago, Ill.

[21] Appl. No.: 231,231

[22] Filed: Aug. 11, 1988

[51] Int. Cl.[5] .......................... H01H 9/02; H02B 1/08

[52] U.S. Cl. .................................. 200/293; 200/573; 439/367; 439/536

[58] Field of Search ............... 200/293, 303, 573, 574; 439/752, 709, 712, 713, 367, 536; 361/392, 393, 394, 395, 399

[56] References Cited

U.S. PATENT DOCUMENTS

| | | | |
|---|---|---|---|
| 2,908,782 | 10/1959 | Kiesel et al. | 200/303 X |
| 3,328,552 | 6/1967 | Gribble et al. | 200/243 X |
| 3,952,178 | 4/1976 | Reese et al. | 200/47 |
| 4,233,479 | 11/1980 | Karpe et al. | 200/303 X |
| 4,291,213 | 9/1981 | Felland et al. | 200/293 X |
| 4,330,693 | 5/1982 | Guery et al. | 200/573 X |
| 4,355,216 | 10/1982 | Kane et al. | 200/303 X |
| 4,622,444 | 11/1986 | Kandatsu et al. | 200/303 |
| 4,695,686 | 9/1987 | Merchant | 200/61.86 |
| 4,776,815 | 10/1988 | Baillet et al. | 439/724 |
| 4,812,605 | 3/1989 | Smith | 200/293 X |
| 4,831,221 | 5/1989 | Yu et al. | 200/553 |

FOREIGN PATENT DOCUMENTS

| | | | |
|---|---|---|---|
| 3340658 | 5/1985 | Fed. Rep. of Germany | 200/295 |
| 1371635 | 10/1974 | United Kingdom . | |

OTHER PUBLICATIONS

International Search Report for International Application PCT/US89/02133, (2 pages), Sep. 26, 1989.

Supplementary European Search Report and Annex for the European Patent Application EP 89 90 7426, (2 pages), Nov. 6, 1991.

Pp. 24 and 25 of a catalog for Cherry Miniature International DA Series, Switches with Spade-type Terminals, no date.

Zierick Manufacturing Corp. catalog, p. 33 for Slip-on Screw-type Adaptor Quick Connect Terminals, no date.

U.S.A. utility patent application Ser. No. 028,774 filed Mar. 23, 1987, and allowed May 9, 1988.

Photographs A, B, and C of Microswitch and Omron Switches with Screw Terminals, no date.

Photographs D, E, F, and G of Cherry Switch with Spade Terminals and Zierick Manufacturing Corp., Slip-on Screw-type Adaptor, "Quick Connect Terminals", no date.

Photographs H, I, G of a Zierick Manufacturing Corp., Slip-on Screw-type Adaptor, "Quick Connect Terminals", no date.

A Portion of a Honeywell Micro Switch Catalogue, 1984.

*Primary Examiner*—Henry J. Recla

*Assistant Examiner*—Glenn T. Barrett

*Attorney, Agent, or Firm*—Dressler, Goldsmith, Shore, Sutker & Milnamow, Ltd.

[57] ABSTRACT

An enclosure is provided for a switch having at least one extending terminal with a first configuration engageable with an adaptor terminal that converts the switch terminal to a second configuration for connection to an electrical lead. The enclosure includes at least one support block defining a switch cavity for receiving at least a portion of the switch and also defines an adaptor terminal cavity for receiving at least a portion of the adaptor terminal with access provided for connection of the electrical lead. Rivets or other fasteners are provided for holding at least the switch and support block together. The support block further includes support surfaces for engaging at least a portion of the adaptor terminal to resist at least some of the force applied to the adaptor terminal as the electrical lead is connected thereto.

3 Claims, 3 Drawing Sheets

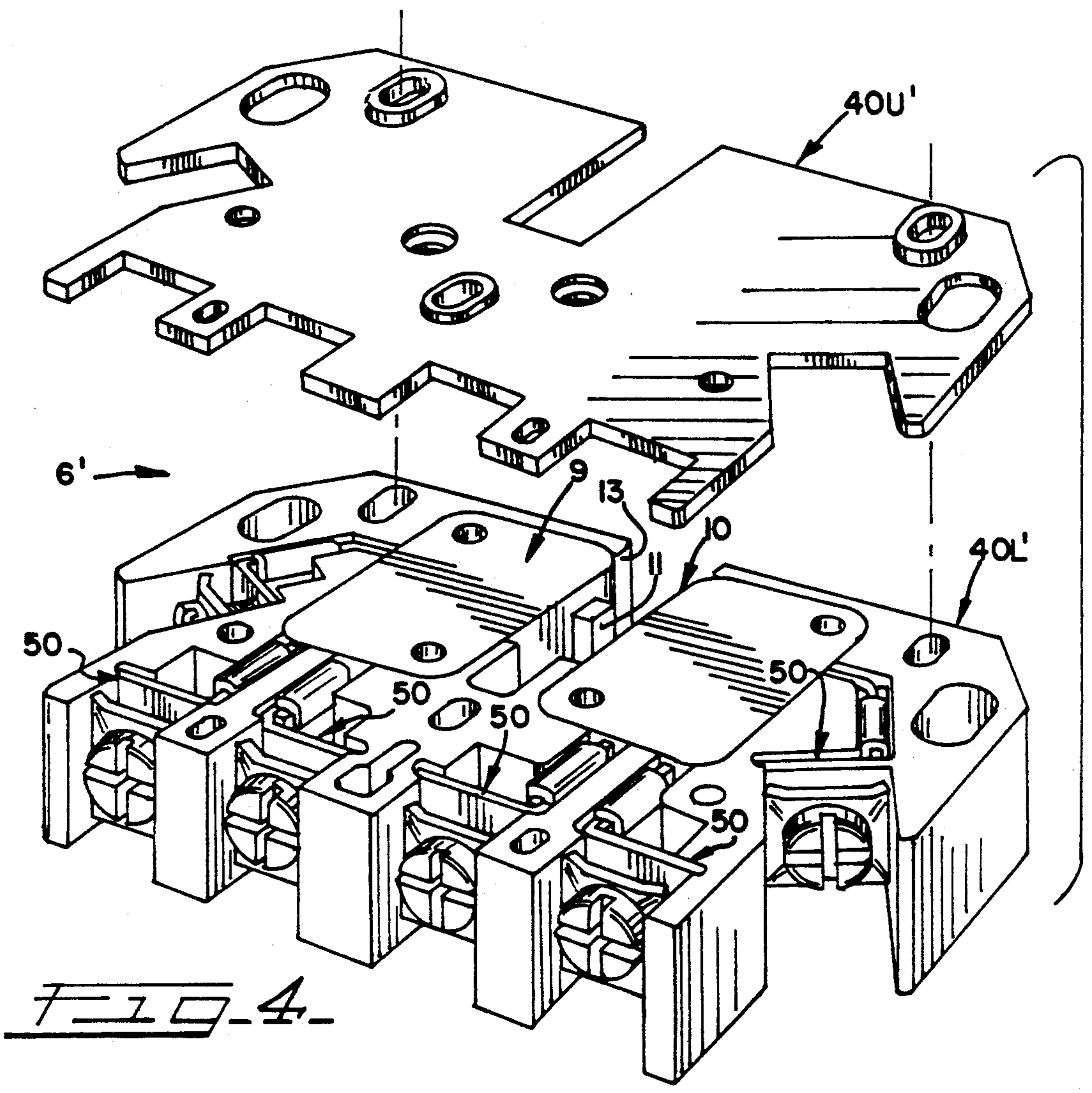
Fig-4-
Fig-5-
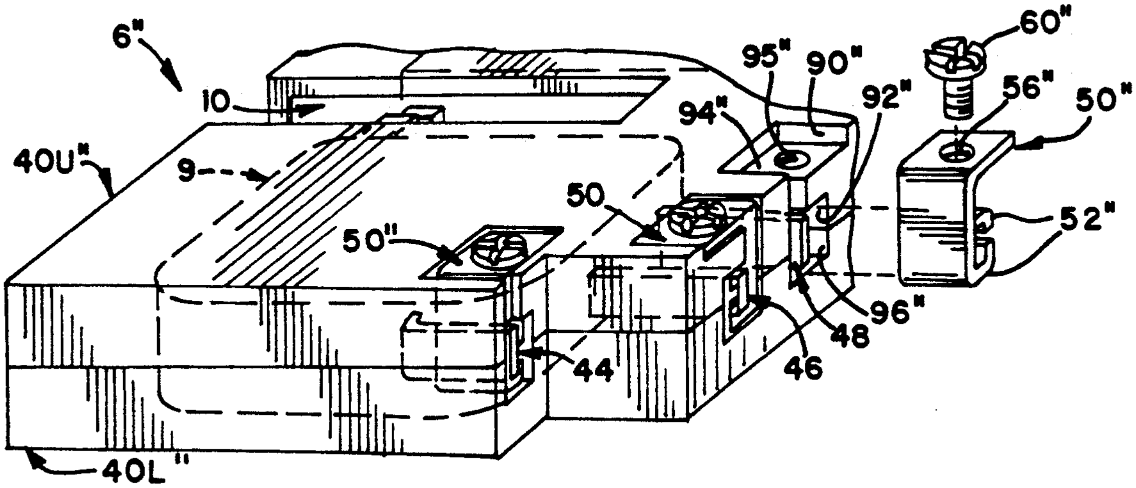

SWITCH ENCLOSURE

TECHNICAL FIELD

This invention relates to a switch module and to enclosures or housings for switches. The invention is particularly well suited for use with miniature switches, such as miniature switches that have an actuator plunger that is engagable by an operating member and that have elongate terminals for connection to electrical leads.

BACKGROUND OF THE INVENTION AND TECHNICAL PROBLEMS PROPOSED BY THE PRIOR ART

Miniature switches are used in a wide variety of applications. Miniature switches are relatively small and delicate. A typical miniature switch has a right rectangular prism-shaped body which may be, for example, about 1.0 inch long, 0.6 inch wide, and 0.4 inch thick with extending spade-type terminals each about 0.4 inch long, 0.25 inch wide, and 0.03 inch thick.

In many situations, miniature switches are provided with spade-type terminals on which are mounted special slip-on adaptors having crimp-type terminals for being crimped to electrical lead wires. The crimping operation, even when executed with care, can exert excessive forces on the switch terminal and other portions of the miniature switch which may damage the miniature switch.

In many applications, for example, where miniature switches are used in a supervisory switch assembly for a water-flow indicator in sprinkler-type fire suppressant systems, connections of electrical leads to the miniature switches are usually field-terminated at the construction site by electricians. Since electricians at a construction site typically connect cable and wire to larger and more substantial components, electricians may not exercise the care that is required to connect the miniature switches without damage to the miniature switch terminals or other portions of the miniature switch. Accordingly, it would be desirable to provide a means for protecting miniature switches, including the miniature switch terminals, from damage during connection of the electrical wires.

With many types of electrical systems (e.g., alarms systems, including those associated with fire suppressant systems) it is necessary to provide the capability for disconnecting the electrical wires from miniature switches, and it is necessary to provide the capability for easily accommodating the replacement of the miniature switches. Thus, it would be desirable to provide an improved system for facilitating switch replacement as well as for facilitating the disconnecting and reconnecting of wires to miniature switches while still providing means for preventing damage to the switches during the wire disconnecting and reconnecting procedures.

In some applications, such as in supervisory switch assemblies used to monitor the position of valves in fire extinguishing sprinkler systems (e.g., as disclosed in U.S. Pat. No. 4,695,686), two miniature switches must be mounted in relatively close proximity to each other. This close mounting of two switches hinders access to the switch terminals and makes it more difficult for the electrician to exercise the care required to properly connect the switches without subjecting the switches to excessive forces. Accordingly, it would be desirable to provide an improved means for mounting to such switches in an appropriate configuration to facilitate the connecting of the electrical wires to the switches.

SUMMARY OF THE INVENTION

A housing, enclosure, or similar containing means is provided for containing a switch having at least one extending conducting member or terminal with a first configuration engagable with a converting means or adaptor terminal that converts the switch terminal to a selected, suitable, second configuration for connection to an electrical lead. Together, the enclosure, the switch, and the adaptor terminal may be characterized as a switch module.

In a preferred embodiment, the enclosure rigidly retains the adaptor terminals in fixed spatial relationship for accommodating a releasable connection of the electrical leads to the adaptor terminals. Preferably, the enclosure functions to rigidly contain the switch and adaptor terminal in fixed relationship to one another and includes support means for resisting distorting forces applied to the adaptor terminal as the electrical wire is being attached.

In a preferred embodiment, the containing means or enclosure includes at least one support block and retaining means for holding the switch and support block together. The support block defines a switch cavity for receiving at least a portion of the switch and also defines an adaptor terminal cavity for receiving at least a portion of the adaptor terminal with access provided for connection of the electrical lead.

A support means is carried by, and is preferably a unitary part of, the support block for engaging at least a portion of the adaptor terminal to bear at least some of the force applied to the adaptor terminal as the electrical lead is connected thereto.

Preferably, the containing means or enclosure includes two of these support blocks, and the switch cavity is defined in each of the support blocks so that the depth of the switch cavity in each of the support blocks at any location in the switch cavity is substantially equal to one-half of the switch height at the corresponding location on the switch.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

FIG. 4 is an exploded perspective view of a second embodiment of a switch module of the present invention; and FIG. 5 is a fragmentary, perspective view of a third embodiment of a switch module of the present invention.

DESCRIPTION OF THE PREFERRED EMBODIMENTS

While this invention is susceptible of embodiment in many different forms, this specification and the accompanying drawings disclose only some specific forms as examples of the use of the invention. The invention is not intended to be limited to the embodiments so described, and the scope of the invention will be pointed out in the appended claims.

Some of the figures illustrating the preferred embodiments show structural details and mechanical elements of conventional miniature switches and adaptor terminals that will be recognized by one skilled in the art. However, the detailed descriptions of such elements are not necessary to an understanding of the invention, and accordingly, are not herein presented.

Figure 1:
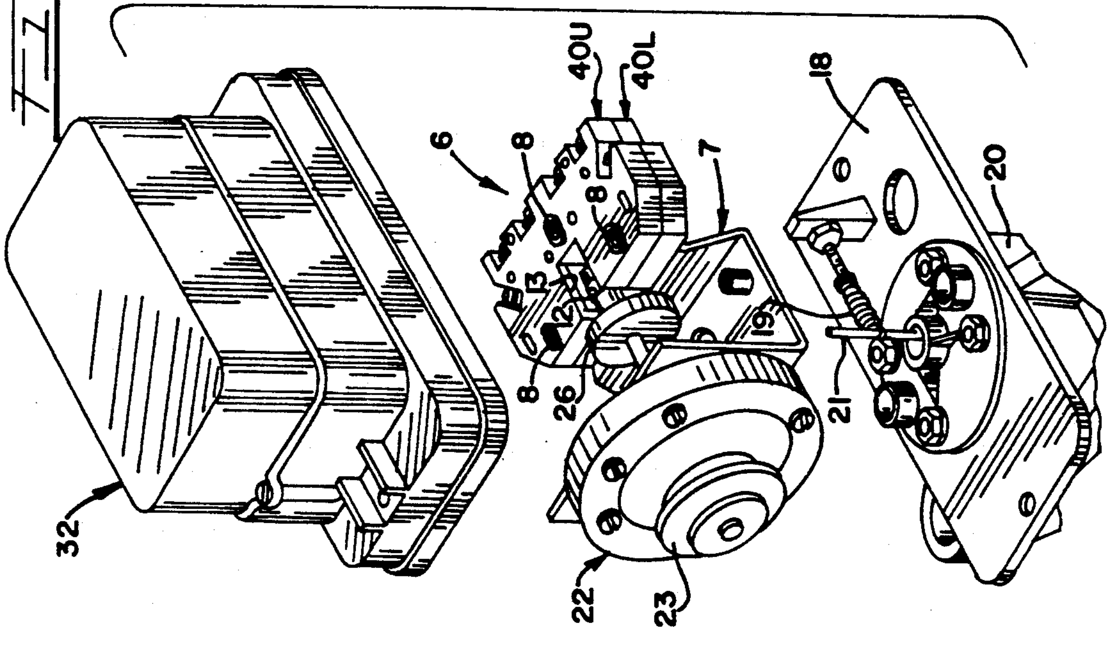
FIG. 1 is a fragmentary, exploded, perspective view of a switch module of the present invention, including an enclosure, as employed in a water-flow detector of the type that may be used in a sprinkler-type fire suppressant system.

FIG. 1 illustrates a switch module 6 of the present invention employed in a water-flow detector of the type that is designed to be mounted on a water pipe of a sprinkler-type fire suppressant system to activate an alarm when water flows in the pipe. The switch module 6 contains two miniature switches 9 and 10 which have plungers 11 and 12, respectively, extending from opposite sides into a recess 13 defined in the module 6.

The switch module 6 is mounted to a mounting bracket 7 by suitable means, such as screws 8. The bracket 7 is in turn mounted to a plate 18 at the top of the body 20 of a vane assembly having a vane or paddle (not visible below the body 20) that is designed for insertion within a pipe of the sprinkler-type fire suppressant system. An arm member 21 connected to the water vane assembly paddle projects upwardly through the plate 18 and normally presses against a stop 26 which is secured to a shaft 24 that extends into the recess 13 in the switch module 6 and that has another stop 27 mounted to the distal end within the recess 13. A shuttle cam 28 is slidably disposed on the shaft 24 between the two stops 26 and 27 and defines a frustoconical cam surface 30 for engaging the switch plungers 11 and 12. A conventional timer diaphragm type air chamber 22 with a variable bleed off mechanism 23 effect movement of the shaft 24 away from the switch module 6 when the arm 21 is moved away from the stop 26 in response to water flow. The entire assembly is preferably enclosed with a cover 32.

Figure 3:
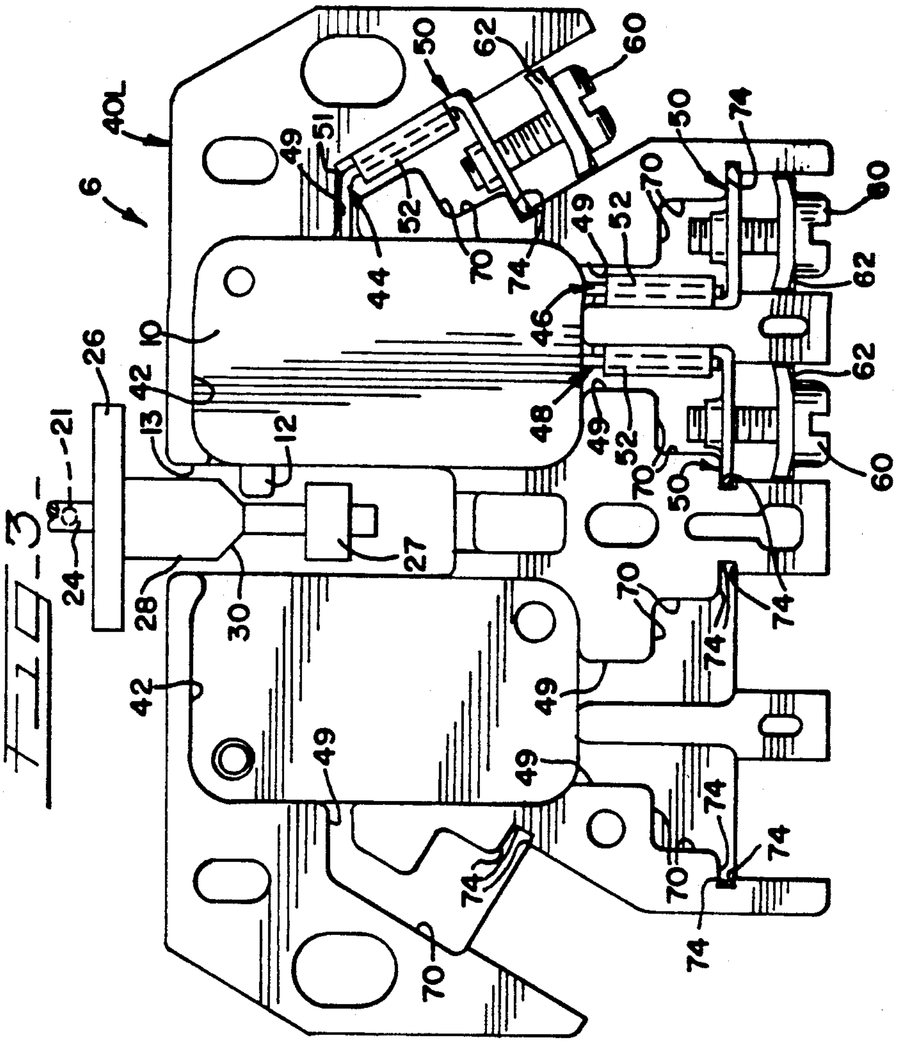
FIG. 3 is a top plan view of the lower support block with the right-hand half of the lower support block containing a miniature switch and adaptor terminals, and the miniature switch is shown in the "on" state with its plunger having been released by retraction of the water-flow detector cam actuator.

The arm 21 is normally biased to the forward position (FIG. 1) by a spring 19. Water flow in the pipe causes the arm 21 to pivot away from the switch module 6 to the position illustrated in phantom by dashed lines in FIG. 3. FIG. 3 shows the actuating cam 28 disengaged from the plunger of the switch which is in an "on" state when water flow through the sprinkler system has caused the water-flow detector mechanisms to move the cam 28 to the retracted, disengaged position.

Although the switch module 6 is shown employed with a water-flow detector having a switch actuator in the form of a shuttle cam 28, it is to be understood that the switch module 6 of the present invention may be used with any suitable actuating member.

The particular components, and the particular operations of the components associated with moving the cam 28 toward and away from the switch module 6, form no part of the present invention. The cam 28 and associated components for effecting movement of the cam 28 are merely illustrative of one particular mechanical engaging member which can be accommodated by the switch module 6 for effecting the actuation of the miniature switch plungers 11 and 12 within the switch module recess 13.

For example, the actuating member need not reciprocate as does the illustrated shuttle cam 28. Instead, a member may be provided that pivots or swings in an arc toward, through, and away from the recess 13 of the switch module 6. Alternatively, an elongate actuating member could be mounted to extend into the recess 13 of the switch module 6 and could be pivoted so as to move laterally away from engagement with one switch plunger and into engagement with the plunger of the other switch in the module.

The miniature switches 9 and 10 are preferably identical, single pole, double throw switches with the plunger-type actuator members 11 and 12, respectively, being biased in the outward direction by a conventional leaf-type spring within the switches. In one contemplated embodiment of the switch module 6 of the present invention, the switches 9 and 10 are preferably 10 ampere, 250 volt, alternating current miniature switches such as those manufactured and sold in the United States of America by Cherry Electric under the Model No. D44.

Figure 2:
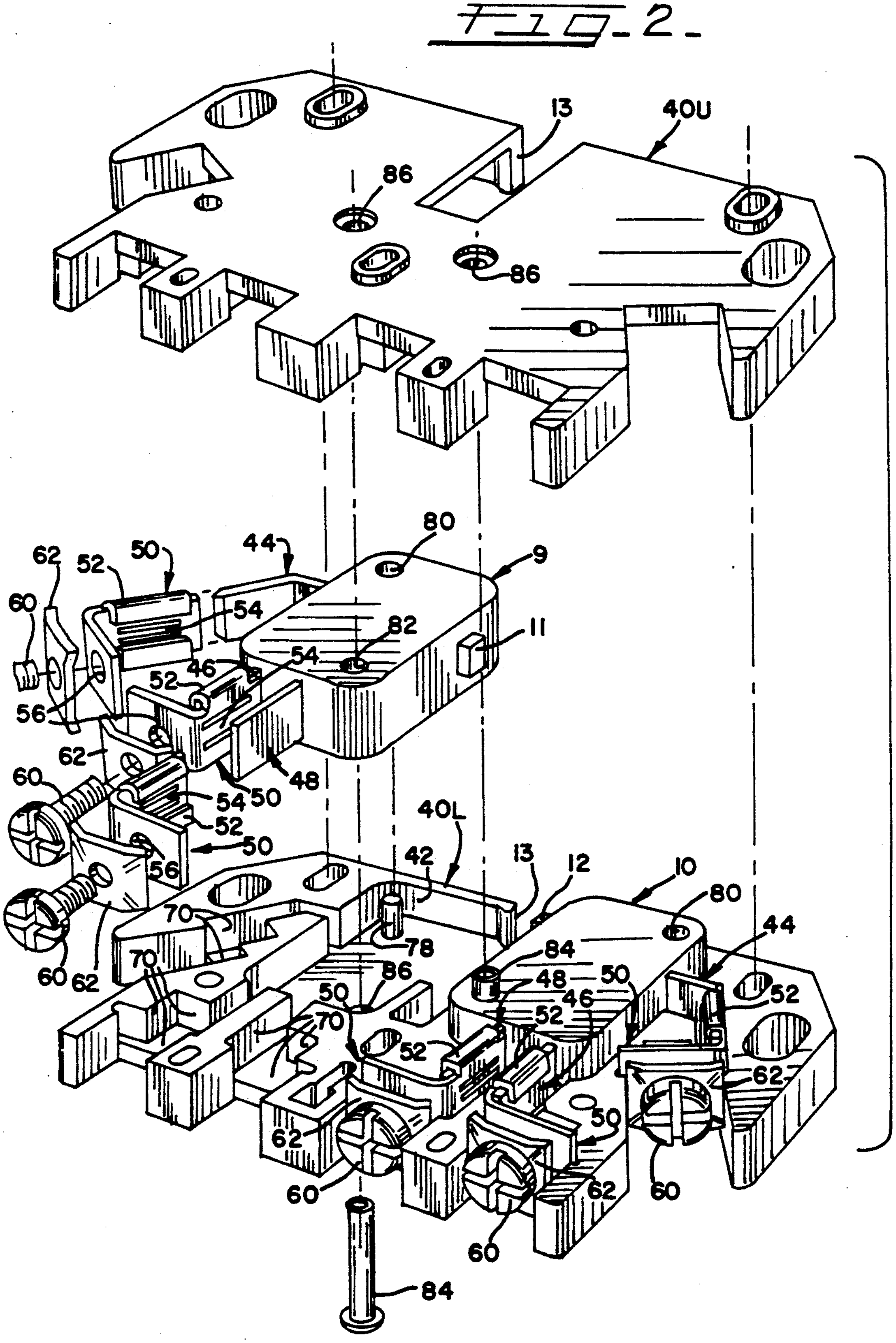
FIG. 2 is an exploded, perspective view of the switch module illustrated in an enlarged scale.

As best illustrated in FIGS. 2 and 3, the switch module 6 includes a containing means for the miniature switches 9 and 10, and in the preferred embodiment, the containing means is a rigid enclosure or housing that consists of a pair of identical, mating support blocks: an upper support block 40U (FIG. 2) and a lower support block 40L (FIG. 2). This permits the use of a single mold for molding the support blocks from a suitable thermoplastic material.

In one contemplated form of the present invention, wherein two miniature switches are employed in the switch module 6, the two support blocks of 40U and 40L define switch cavities 42 for receiving a portion of one of the switches 9 or 10. the depth of a switch cavity 42 in each support block at any location in the switch cavity is substantially equal to one-half of the switch height at the corresponding location on the switch. Thus, one-half of the height of the switch is received within the upper support block 40U, and one-half of the switch height is received in the lower support block 40L.

Each switch cavity 42 is open laterally toward the other cavity at the central void or recess 13 so that the switch plunger (plunger 11 on switch 9 and plunger 12 on switch 10) can project outwardly into the recess 13.

As best illustrated in FIG. 2, each switch cavity 42 may be provided with an upwardly projecting locating post 78 for being received in a conventional mounting hole 80 in the switches 9 and 10.

In the embodiment illustrated, each switch 9 and 10 includes three extending, shaped, electrical conducting members or terminals 44, 46, and 48. In general, each terminal 44, 46, and 48 can be characterized as having at least a distal end with a spade-type configuration about 0.03 inch thick, 0.25 inch wide, and 0.4 inch long. Although terminals 46 and 48 are generally planar and parallel to each other, terminal 44 is bent at a 30° angle between its distal end and a base portion that extends directly into the body of the switch.

The support block switch cavities 42 are configured to define extending passageways 49 (FIG. 3) for receiving the switch terminals. Since the terminal height (as viewed in FIG. 2) is less than the height of the switch, the passages 49 are not as deep as the main cavity 42.

It is desirable to provide means for accommodating the connection of an electrical lead or wire to each switch 9 and 10. For convenience, and/or where releasability of the electrical lead from the switch is desired, crimping or soldering an electrical lead wire to a terminal of the switch is undesirable. The switch module 6 of the present invention is adapted to facilitate connection of an electrical lead to a switch terminal in a manner that is relatively easy and in a manner that permits subsequent removal of the electrical lead from the switch terminal.

To this end, each spade-type terminal 44, 46, and 48 can be converted to a different, selected terminal shape by the use of converting means or adaptor terminals 50 (FIG. 2). Conventional adaptor terminals 50 may be employed such as the slip-on, screw-type adaptor terminal sold in the U.S. of America by Zierick Manufacturing Corporation, Radio Circle, Mount Kisco, N.Y. 10549, U.S.A. under the tradename "Quick Connect Terminals" and product designation "Female 0.250 Terminal No. 774--No Locking Tabs."

The adaptor terminal 50 includes a sleeve portion 52 (FIG. 2) for slipping on the distal end of a switch terminal 44, 46, or 48. The adaptor terminal 50, in the back of the sleeve portion 52, is provided with a central portion 54 between a pair of slots, and portion 54 is bowed inwardly to provide a spring clamping effect which aids in retaining the adaptor terminal 50 on the switch terminal.

The adaptor terminal 50 has a terminal end defining a threaded aperture 56. A clamping screw 60 is provided for being received in the threaded aperture 56, and a clamping washer 62 is provided for being mounted on the screw 60 and clamping the electrical lead wire against the adaptor terminal 50 around the aperture 56.

The use of a screw-type adaptor terminal accommodates a variety of electrical lead wire sizes and permits the electrical lead wires to be disconnected and reconnected as may be necessary.

The adaptor terminals 50 are mounted on the switch terminals 44, 46, and 48 before each switch 9 and 10 is located between the upper support block 40U and lower support block 40L in a cavity 42. As best illustrated in FIGS. 2 and 3, the upper support block 40U and lower support block 40L define an adaptor terminal cavity 70 for receiving at least a portion of an adaptor terminal 50 associated with each switch terminal. Each cavity 70 is configured to receive the right-angled configuration of the screw end of the adaptor terminal 50 and to accommodate the screw 60 received in the adaptor terminal 50.

As best illustrated in FIG. 3, a portion of each switch terminal passage 49 also functions as a portion of the adaptor terminal cavity 70 with respect to the sleeve 52 of the adaptor terminal 50 which is slidably received on the distal end of the switch terminal.

When an electrical lead wire is connected to the adaptor terminal 50, forces are typically imposed on the adaptor terminal 50 during the connection process. For example, when the screw 60 is driven inwardly to clamp the electrical lead wire against the adaptor terminal 50, a force is imposed on the adaptor terminal 50, and this force could be transferred, in part, to the switch terminal.

In order to avoid subjecting the adaptor terminal 50 and the associated switch terminal to excessive forces which might damage the switch terminal or other parts of the switch, a novel support means is provided in the support blocks 40U and 40L. Specifically, with reference to the left-hand "empty half" of the lower support block 40L illustrated in FIG. 3, the lower support block 40L includes wall surfaces 74 which are unitary with the block 40L to define a channel for receiving the distal end of the adaptor terminal 50 adjacent the terminal aperture 56.

As best illustrated in the right-hand side of FIG. 3, when a threading force is applied to the screw 60 in the adaptor terminal 50, the rearward movement of the adaptor terminal 50 toward the switch is prevented because the adaptor terminal 50 bears against the rear wall surface 74. Thus, at least some of the force exerted on the terminal clamping screw 60 is at least partially transferred through the adaptor terminal 50 and is borne by the wall surface 74 of the lower support block 40L. Since the upper support block 40U has a similar channel configuration with wall surfaces 74, the upper portion of the adaptor terminal 50 is similarly supported by the upper support block 40U.

It is seen that the wall surfaces 74 thus function as force-resisting means for resisting distorting forces applied to the terminals as the electrical leads are being attached thereto.

With continued reference to FIG. 3, it is seen that other wall surfaces of the adaptor terminal cavity 70 function to support a portion of the exterior surface of the adaptor terminal. Further, with respect to the adaptor terminal engaged with the angled switch terminal 44 (as best illustrated in the right-hand side of FIG. 3), it is seen that the terminal 50 has a distal end 51 which engages the rear wall of the terminal passage 49. Thus, forces transmitted along the adaptor terminal sleeve 52 are at least partially transferred through the end 51 into the wall surface of the switch terminal passage 49 in the lower support block 40L (and similarly in the upper support block 40U).

When a conventional switch 9 or 10 is provided with a bore 82 (visible in the left-hand switch 9 in FIG. 2), the bore 82 may be employed for receiving retaining means or a fastening member, such as a rivet 84, and the upper support block 40U and lower support block 40L may be provided with registered bores 86 for receiving extending end portions of the rivet 84. The distal ends of the rivet 84 are peened over to retain the support blocks 40U and 40L together around the switches 9 and 10 and the adaptor terminals 50. Of course, the support blocks 40U and 40L could be adapted to accommodate other retaining means or conventional fasteners such as machine screws and nuts.

When the support blocks 40U and 40L are properly fastened together around the switches 9 and 10 and adaptor terminals 50 to form the switch module 6, the adaptor terminal clamping screws 60 are accessible from three sides, and the electrical lead wires can be introduced from above or below the switch module 6.

FIG. 4 illustrates a second embodiment of the switch module 6' of the present invention. The switch module 6' includes an upper support block 40U' and a lower support block 40L'. The lower support block 40L' contains the cavities for the switches 9 and 10 and the associated terminal adaptors 50. In this second embodiment, the depth of the cavities is substantially equal to the height of the switches and adaptor terminals. The configuration of the lower support block 40L' is otherwise substantially identical to the configuration of the support block 40L of the first embodiment described above with reference to FIGS. 1-3.

The upper support block 40U' of the second embodiment of the switch module 6' is a relatively thin, plate-like member that does not define any cavities for the switches or adaptor terminals. The upper support block 40U' is adapted to be secured to the lower support block 40L', such as with rivets (e.g., rivets 84 illustrated in FIG. 2 for use with the first embodiment of the switch module).

FIG. 5 illustrates a third embodiment of the switch module 6". The switch module 6" includes an upper support block 40U" secured to a lower support block 40L" by suitable means (e.g., such as the rivets 84 employed with the first embodiment of the switch module illustrated in FIG. 2).

The upper support block 40U" and lower support block 40L" each define suitable cavities for the switches and adaptor terminals. In this third embodiment, the adaptor terminals, designated by reference numeral 50", have a different shape than the terminals 50 used in the first and second embodiments of the switch module. Each adaptor terminal 50" includes a sleeve 52" for being received on a spade-type terminal of the switch. The adaptor terminal 50" extends laterally from the sleeve 52" and is bent at a right angle to provide a portion which defines a threaded aperture 56" for receiving a clamping screw 60". It is seen that the configuration of the adaptor terminal 50" thus orients the clamping screw and electrical lead clamping region of the terminal toward the upper side of the upper support block 40U".

In order to accommodate the adaptor terminals 50", the configuration of the adaptor terminal cavities in the upper support block 40U" differ from the configuration of the adaptor terminal cavities in the lower support block 40L". Specifically, the upper support block 40U" includes a cavity with an upper recess 90" and a lower recess 92". The recesses 90" and 92" are separated from each other by a support ledge 94" but communicate at a space or passageway at an end of the support member 94". The support ledge 94" defines a bore 95" for accommodating the projecting distal end of the adaptor terminal screw 60".

The lower support block 40L" defines a bottom cavity 96" which communicates with, and is in registry with, the recess 92" in the upper support block 40U".

When using the switch module 6", the switches 9 and 10 are inserted into the appropriate cavities in one of the support blocks, and then the other support block is then properly positioned over the switches. Next, the two support blocks are secured together. Then, the adaptor terminals 50" are inserted into the adaptor terminal cavity recesses 90", 92", and 96" so that each adaptor terminal sleeve 52 is received on a switch terminal. Electrical leads may then be connected to each adaptor terminal 50" and clamped thereto with a screw 60".

It is seen that the support ledge 94" supports the distal end of the adaptor terminal 50" and can bear the downward forces exerted on the adaptor terminal 50" when the clamping screw 60" is screwed into the adaptor terminal 50" to tightly clamp the electrical lead. This substantially reduces or eliminates the undesirable transfer of forces to the switch terminal.

In the illustrated embodiments of the switch modules, the adaptor terminals have been shown as slip-on, screw-type adaptor terminals which convert a spade-type terminal of a switch to a clamping screw-type terminal. It will be appreciated that other adaptor terminal configurations may be accommodated with the present invention.

For example, in some applications, it may be desirable to provide an adaptor terminal for converting a spade-type switch terminal to a female receiving terminal for a plug-ended electrical lead wire. In such an application, the adaptor terminal would have one end in the shape of a sleeve-like configuration for being slipped onto the spade-type terminal of the switch and would have the other end in the shape of a sleeve-like configuration for receiving the plug or spade member on the end of the electrical wire. Since no clamping screw is used with such an adaptor terminal, disconnecting and reconnecting of the electrical lead wires can be done more easily. The support blocks of the switch module for receiving such an adaptor terminal could be provided with appropriate support surfaces for bearing the thrust loads and torsional loads imposed on the adaptor terminal during insertion of the electrical lead plug end so as to substantially reduce or eliminate forces transferred to the terminal of the switch.

It will be readily observed from the foregoing detailed description of the invention and from the illustrated embodiments thereof that numerous variations and modifications may be effected without departing from the true spirit and scope of the novel concepts or principles of this invention.

Further, although the invention has been described or depicted as being used with two miniature switches arranged in a particular configuration for use with a particular water-flow detector apparatus, it will be understood that the inventive concepts of the present invention can be used with only one switch or with more than two switches. Further, the inventive concepts of the present invention can be used with a plurality of switches arranged in different relative positions and orientations. Accordingly, it is intended that all such changes, alterations, and modifications as come within the scope of the appended claims be considered part of the present invention.

What is claimed is:

1. An enclosure which is adapted to hold two switches which each have (1) a mechanically actuatable switch plunger and (2) at least one extending space-type terminal engageable with a sleeve of a slipon screw-type adapter terminal that defines a threaded aperture for a terminal clamping screw, said enclosure comprising:

a pair of mating support blocks for holding said switches and adaptor terminals and for providing a protective impact barrier for portions of said switches and adaptor terminals, each said support block including at least one mating surface for mating with a surface of the other support block;

at least one of said support blocks defining two switch cavities spaced apart on either side of a central void which can accommodate therein a movable switch actuating member;

each said switch cavity opening laterally toward the other at said central void whereby each said switch cavity can receive one of said switches with the switch plunger of each switch located at said lateral opening to extend into said central void for being actuated by said actuating member;

said one support block also defining at least two adaptor terminal cavities for each receiving at least a portion of one of said adaptor terminals;

means for retaining said support blocks together around said switches and adaptor terminals when said switches and adaptor terminals are disposed in their respective cavities; and said one support block including adaptor terminal support means for engaging at least a portion of each said adaptor terminal adjacent said threaded aperture to bear at least some of the force loading applied to each said adaptor terminal as one of said screws is screwed into one of said adaptor terminals.

2. An enclosure which is adapted to hold two switches which each have (1) a mechanically actuatable switch plunger and (2) at least one extending spade-type terminal engageable with a sleeve of a slipon screw-type adaptor terminal that defines a threaded aperture for a screw, said enclosure comprising:

a pair of mating support blocks, each said support block including at least one mating surface for mating with a surface of the other support block;

at least one of said support blocks defining two switch cavities spaced apart on either side of a central void which can accommodate therein a movable switch actuating member;

each said switch cavity opening laterally toward the other at said central void whereby each said switch cavity can receive one of said switches with the switch plunger of each switch located at said lateral opening to extend into said central void with access for being actuated by said actuating member;

said one support block also defining at least two adaptor terminal cavities for each receiving at least a portion of one of said adaptor terminals with access provided for insertion of a screw into each said adaptor terminal;

retaining means for retaining said support blocks together around said switches and adaptor terminals when said switches and adaptor terminals are disposed in their respective cavities;

support means carried by at least said one support block for engaging at least a portion of each said adaptor terminal adjacent said threaded aperture to bear at least some of the force loading applied to each said adaptor terminal as one of said screws is screwed into one of said adapter terminals.

3. An enclosure for containing a switch having at least one extending spade-type terminal engageable with a sleeve of a slip-on adaptor which is attachable to an external conductor, the enclosure comprising:

a pair of mating housing blocks for holding said switch and adaptor and for providing a protective impact barrier for portions of the switch and adaptor, each said housing block including at least one mating surface for mating with a surface of the other block;

at least one of said blocks defining a switch cavity for receiving at least a portion of the switch;

said one block also defining an adaptor cavity for receiving at least a portion of the adaptor;

means for retaining said blocks together around the switch and adaptor when the switch and adaptor are disposed in their respective cavities;

said one block including means for supporting at least a portion of the adaptor as the external conductor is attached thereto;

said enclosure being adapted for containing a second switch, displaced from the other switch with the two switches actuatable essentially simultaneously by a movable switch actuating member; and said one block defining a second switch cavity spaced apart from the other cavity with a central void therebetween which can accommodate therein the movable switch actuating member.

* * * * *

UNITED STATES PATENT AND TRADEMARK OFFICE

CERTIFICATE OF CORRECTION

PATENT NO. : 5,213,205

DATED : May 25, 1993

INVENTOR(S) : Laubach et al.

It is certified that error appears in the above-indentified patent and that said Letters Patent is hereby corrected as shown below:

Column 8, line 47, please replace "space-type" with -- spade-type --.

Column 8, line 48, please replace "slipon" with -- slip-on --.

Column 9, line 20, please replace "slipon" with -- slip-on --.

Signed and Sealed this

Second Day of August, 1994

Attest:

BRUCE LEHMAN

Attesting Officer

Commissioner of Patents and Trademarks